United States Patent [19]

Sugise et al.

[11] Patent Number: 5,112,783
[45] Date of Patent: May 12, 1992

[54] CONDUCTIVE COPPER OXIDE CERAMICS AND PROCESS FOR PRODUCING SAME

[75] Inventors: Ryoji Sugise, Yamaguchi; Hiroshi Daimon, Chiba; Itsuhiro Fujii, Yamaguchi; Hideo Ihara, Ibaraki; Norio Terada, Ibaraki; Masatoshi Jo, Ibaraki; Masayuki Hirabayashi, Ibaraki, all of Japan

[73] Assignees: Ube Industries, Ltd., Yamaguchi; Agency of Industrial Science & Technology, Tokyo, both of Japan

[21] Appl. No.: 639,931

[22] Filed: Jan. 14, 1991

[30] Foreign Application Priority Data

Jan. 22, 1990 [JP] Japan .................................. 2-12085
Mar. 27, 1990 [JP] Japan .................................. 2-78380

[51] Int. Cl.$^5$ .............................................. C04B 35/02
[52] U.S. Cl. .................................... 501/126; 501/152; 252/521; 423/395; 423/397, 423/463
[58] Field of Search .................... 505/1, 776, 779, 783, 505/736, 737; 252/62.3 C, 62.3 GA, 521; 423/395, 397, 463; 501/98, 126, 152

[56] References Cited

U.S. PATENT DOCUMENTS 4,898,851 2/1990 Michel ................................ 252/521
4,900,715 2/1990 Cooper et al. ...................... 252/521

FOREIGN PATENT DOCUMENTS 0149404 6/1990 Japan .................................. 505/737

Primary Examiner—William R. Dixon, Jr.
Assistant Examiner—Paul Marcantoni
Attorney, Agent, or Firm—Kanesaka and Takeuchi

[57] ABSTRACT

Cubic conductive copper oxide ceramics which are represented by the following formula I:

$$(M_xCu_y)_7O_zA_w \qquad I$$

wherein M represents at least one element selected from the group consisting of In, Sc, Y, Tl, and Ga, A represents Cl, NO$_3$, or Cl and NO$_3$, x+y is a value of 1, x/y is a number of 0 to 10, z is a number of from 6 to 8, and w is a number of from 1 to 9, and processes for producing same by mixing at least one nitrate and/or chloride of a metal selected from the group consisting of In, Sc, Y, Tl, and Ga, with copper nitrate and/or copper chloride, and firing the mixture at from 200° to 600° C. The copper oxide ceramics are preferably used as electrodes in various fields, heat emiters and also as a material for producing superconductors.

7 Claims, 8 Drawing Sheets

FIG.8
o:CuO

FIG.9
○:CuO

CONDUCTIVE COPPER OXIDE CERAMICS AND PROCESS FOR PRODUCING SAME

BACKGROUND OF THE INVENTION

1. Field of the Invention

This invention relates to new conductive copper oxide ceramics having a cubic structure and processes for producing the ceramics using commercially available and inexpensive materials and firing them at a relatively low temperature.

2. Description of the Related Art

Conductive ceramics have been heretofore widely utilized as an electrode and a heat emiter according to superior stability against corrosion and thermal degradation of ceramics. For example, in chlorine industry, $RuO_2$ is quite useful material for an electrode, since it consumes less amount of electric power, and has excellent corrosion stability. $RuO_2$ has been also used as a thermal head of a thermo-transcription printer. Conductive ceramics have also applied to an electrode of various sensors to convert some atmospheric change to an electrical signal.

Furthermore, application of conductive ceramics includes uses of ITO(In-Sn-O system) ceramics for a transparent electrode, PLZT(Pb-La-Zn-Ti system) ceramics for an optical switch and an optical shutter. In considering thermal resistance of ceramics, La-Cr-O system ceramics and La-Co-O system ceramics can be very useful for a heat emiter of a furnace or an electrode of a fuel cell.

As described above, conductive ceramics have been used in various fields of industries. Accordingly, conductive ceramics are desired which can be produced easily and economically using easily obtainable materials.

SUMMARY OF THE INVENTION

The present invention relates to new cubic conductive copper oxide ceramics which are represented by the following formula: $(M_xCu_y)_7O_zA_w$ wherein M represents at least one element selected from the group consisting of In, Sc, Y, Tl, and Ga, A represents Cl, $NO_3$, or Cl and $NO_3$, $x+y$ is a value of 1, $x/y$ is a number of from 0 to 10, $z$ is a number of from 6 to 8, and $w$ is a number of from 1 to 9.

In accordance with the present invention, there is provided a process for producing the cubic conductive copper oxide ceramics by mixing at least one nitrate and/or chloride of a metal selected from the group consisting of In, Sc, Y, Tl, and Ga, with copper nitrate and/or copper chloride, and firing the mixture at from 200° to 600° C.

DESCRIPTION OF PREFERRED EMBODIMENTS

New cubic conductive copper oxide ceramics of the present invention are represented by the following formula: $(M_xCu_y)_7O_zA_w$ wherein M represents at least one element selected from the group consisting of In, Sc, Y, Tl, and Ga, A represents Cl, $NO_3$, or Cl and $NO_3$, $x+y$ is a value of 1, $x/y$ is a number of from 0 to 10, $z$ is a number of from 6 to 8, and $w$ is a number of from 1 to 9.

The XRD patterns of the above described copper oxide ceramics show characteristic peaks at $2\theta = 16.0$ to 16.8, 29.5 to 33.5, 37.8 to 38.7, 54.6 to 56.2 and these peaks are assigned to (111), (222), (400), and (440) of a cubic structure with a lattice constant of about 9.2 to 9.8Å.

For the copper oxide ceramics of $(M_xCu_y)_7O_zA_w$ wherein A represents $NO_3$, or Cl and $NO_3$, a peak on infrared absorption spectra is observed at about 1360 to 1380 $cm^{-1}$ which is characteristic to $NO_3$.

The conductive copper oxide ceramics of the present invention are recognized from the above described peak profile to have a similar crystal structure to cubic $Ag_7O_8(NO_3)$. The conductivity of the copper oxide ceramics is attributed to its cubic composition in which a part of oxygen atoms is lost and an oxidation number of a copper atom might be between $+2$ and $+3$.

The conductive copper oxide ceramics of the present invention are produced by mixing at least one nitrate and/or chloride of a metal selected from the group consisting of In, Sc, Y, Tl, and Ga, with copper nitrate and/or copper chloride, and firing the mixture at from 200° to 600° C. The metal nitrate and copper nitrate are used for the production of $(M_xCu_y)_7O_z (NO_3)$ and the metal nitrate and copper chloride, or the metal chloride and copper nitrate are favorably used for the production of $(M_xCu_y)_7O_z(Cl)$, or $(M_xCu_y)_7O_z (Cl, NO_3)$. The nitrate compounds include hydrates theirof. As a copper nitrate compound, basic copper nitrate, $Cu_2(OH)_3\cdot(NO_3)$ can be also used.

A process of mixing the metal compounds and the copper compounds includes co-ball milling of the compounds, mixing solutions of the compounds followed by the evaporation of water and etc.

Firing the mixture of the metal compounds and the copper compounds is carried out at from 200° to 600° C. generally in air or oxygen using an ordinary heating apparatus such as an electric furnace. If a temperature of firing is more than 600° C., non-conductive $M_2O_3$ or CuO is increasingly formed resulting in a low yield of the conductive copper oxide ceramics. If a temperature of firing is below 200° C., the decomposition of a mixture of the metal and copper compounds does not sufficiently occur for the formation of the conductive copper oxide ceramics. A firing time between 1 minute and 50 hours is suitably employed.

The copper oxide ceramics of $Cu_7O_z (NO_3)$ is produced simply by firing copper nitrate at from 200° to 600° C. In particular, this copper oxide ceramics is preferably produced in the presence of $(M_xCu_y)_7O_z (NO_3)$ which plays a role of a crystallization seed in an amount of 0.1 to 10 percent by weight based on copper nitrate.

The cubic conductive copper oxide ceramics of the present invention have good thermal characteristics, good corrosion resistance, and good mechanical properties. These ceramics can be produced using commercially available materials by firing them at a relatively low temperature. The ceramics are preferably used as electrodes in various fields and heat emiters. The ceramics are also useful as catalysts for various chemical reactions and as a material for producing superconductors.

The cubic conductive copper oxide ceramics and the processes for producing same will now be described in detail with reference to the following examples.

EXAMPLE 1

Figure 1:
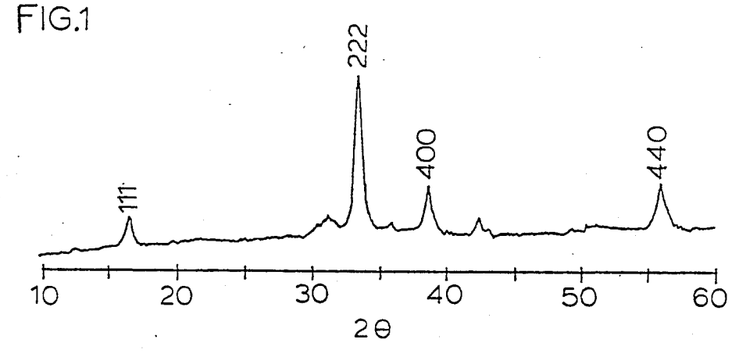
FIGS. 1, 3 to 9, 10, and 12 to 15 show the XRD patterns of the conductive copper oxide ceramics produced in Example 1 to 13 respectively.
Figure 2:
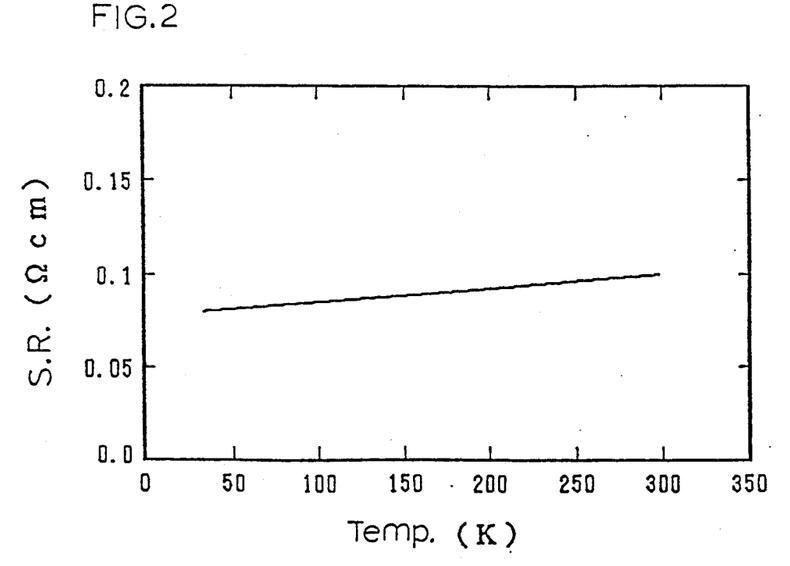
FIGS. 2 and 11 are the relationships between a temperature and a specific resistance of the conductive copper oxide ceramics produced in Example 1 and 9 respectively.

Indium nitrate trihydrate of 2.27 g and copper nitrate trihydrate of 7.73 g in a mole ratio of In/Cu=1/5 were well mixed and the mixture was fired in oxygen at 450° C. for 10 minutes. FIG. 1 shows the XRD(Cu K$\alpha$ ray) pattern of the product obtained. From XRD analysis, the product was identified as the copper oxide ceramic, $(In_{1/6}Cu_{5/6})_7O_z(NO_3)$. FIG. 2 shows the relationship between a temperature and a specific resistance of the ceramic. This indicates that the ceramic has a fairly good electric conductivity and the specific resistance was 0.1$\Omega \cdot$ cm at a room temperature.

EXAMPLE 2

Figure 3:
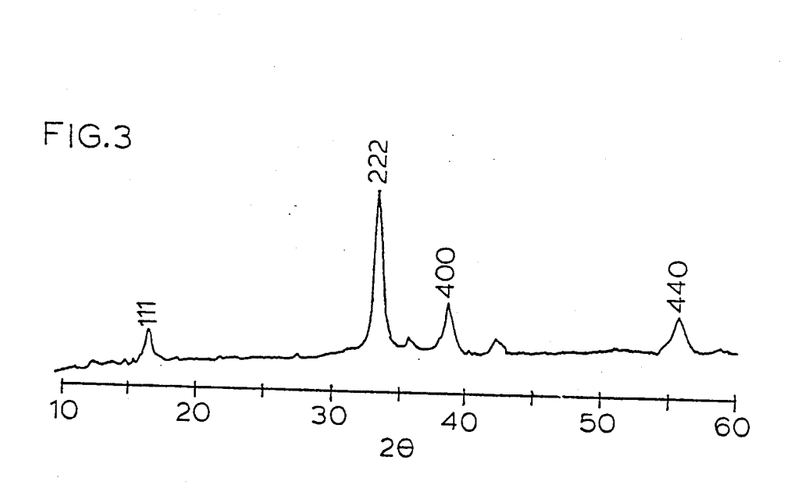

Indium nitrate trihydrate of 1.28 g and copper nitrate trihydrate of 8.72 g in a mole ratio of In/Cu=1/10 were well mixed and the mixture was fired in oxygen at 600° C. for 5 minutes. The product was identified as the copper oxide ceramic, $(In_{1/11}Cu_{10/11})_7O_z(NO_3)$ by the XRD pattern shown in FIG. 3. The specific resistance was 0.1$\Omega \cdot$ cm at a room temperature.

EXAMPLE 3

Figure 4:
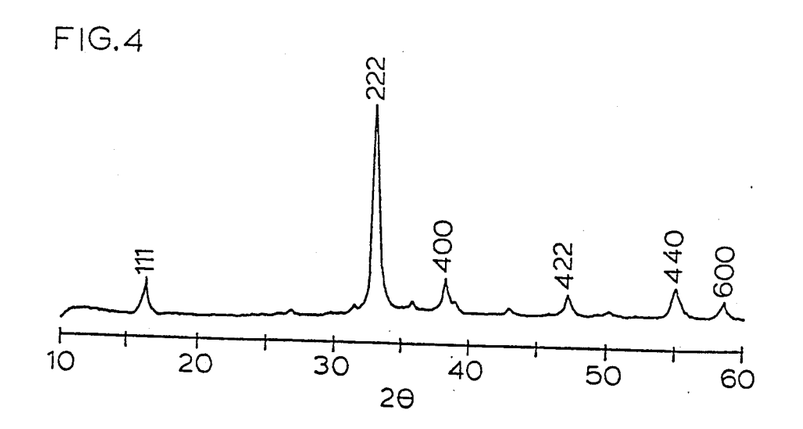

Indium nitrate trihydrate of 0.145 g and copper nitrate trihydrate of 9.86 g in a mole ratio of In/Cu=1/100 were well mixed and the mixture was fired in oxygen at 250° C. for 3 hours. The product was identified as the copper oxide ceramic, $(In_{1/101}Cu_{100/\Phi})_7O_z(NO_3)$ by the XRD pattern shown in FIG. 4. The specific resistance was 0.1$\Omega \cdot$ cm at a room temperature.

EXAMPLE 4

Figure 5:
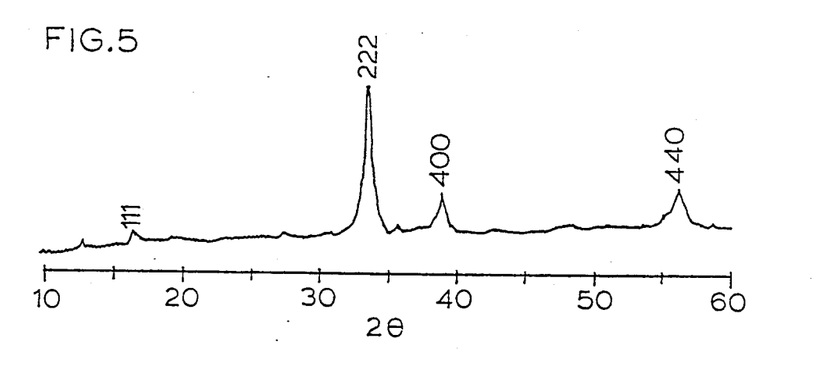

Scandium nitrate tetrahydrate of 2.01 g and copper nitrate trihydrate of 8.00 g in a mole ratio of Sc/Cu=1/5 were well mixed and the mixture was fired in oxygen at 450° C. for 10 minutes. The product was identified as the copper oxide ceramic, $(Sc_{1/6}Cu_{5/6})_7O_z(NO_3)$ by the XRD pattern shown in FIG. 5. The specific resistance was 0.1$\Omega \cdot$ cm at a room temperature.

EXAMPLE 5

Figure 6:
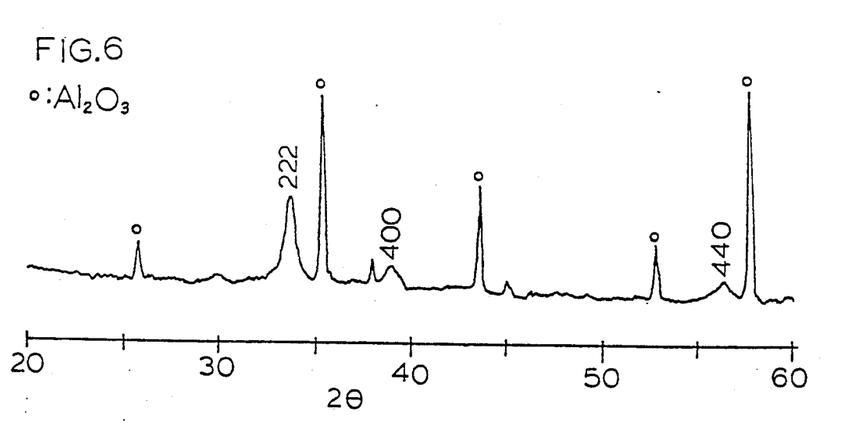

Scandium nitrate tetrahydrate of 2.01 g and copper nitrate trihydrate of 8.00 g in a mole ratio of Sc/Cu=1/5 were dissolved in water of 10 ml, the solution was spin-coated on an alumina substrate, and the substrate was fired in oxygen at 450° C. for 5 minutes. The product on the substrate was identified as the copper oxide ceramic, $(Sc_{1/6}Cu_{5/6})_7O_z(NO_3)$ by the XRD pattern shown in FIG. 6. The specific resistance was 0.2$\Omega \cdot$ cm at a room temperature.

EXAMPLE 6

Figure 7:
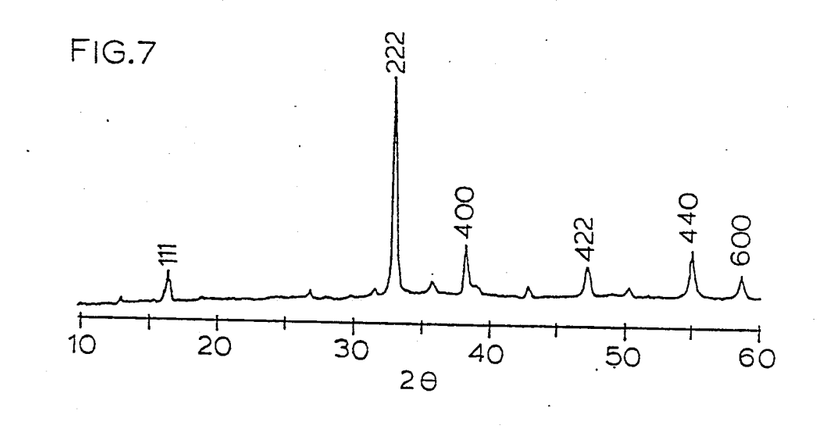

Copper nitrate trihydrate of 10.0 g and $(In_{1/6}Cu_{5/6})_7O_z(NO_3)$ of Example 1 of 0.1 g were well mixed and the mixture was fired in oxygen at 250° C. for 2 hours. The product was identified as the copper oxide ceramic, $Cu_7O_z(NO_3)$ by the XRD pattern shown in FIG. 7. The specific resistance was 0.1$\Omega \cdot$ cm at a room temperature.

EXAMPLE 7

Figure 8:
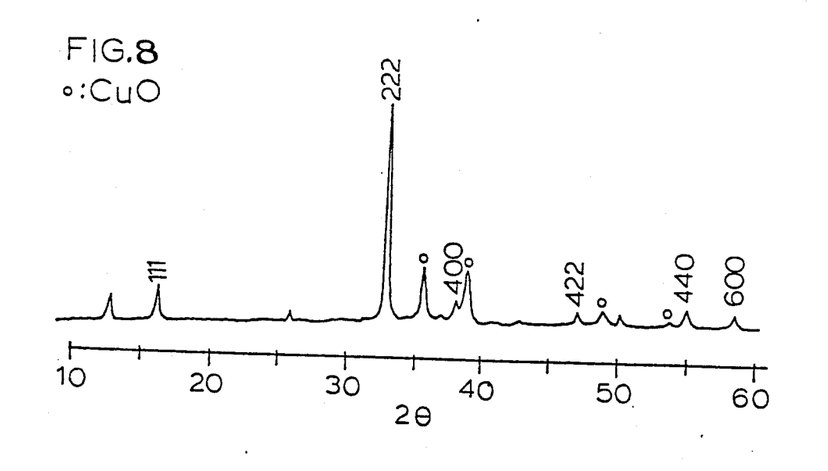

Copper nitrate trihydrate of 10.0 g was fired in oxygen at 250° C. for 3 hours. The product was identified as the copper oxide ceramic, $Cu_7O_z(NO_3)$ by the XRD pattern shown in FIG. 8. The specific resistance was 0.2$\Omega \cdot$ cm at a room temperature.

EXAMPLE 8

Figure 9:
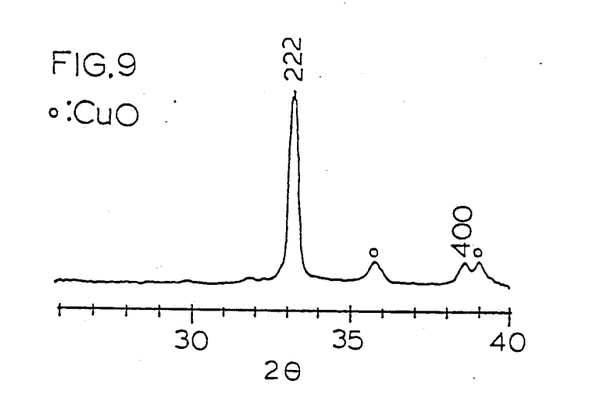

Yttrium nitrate hexahydrate of 2.84 g and copper nitrate trihydrate of 7.16 g in a mole ratio of Y/Cu=1/4 were well mixed and the mixture was fired in oxygen at 250° C. for 15 hours. The product was identified as the copper oxide ceramic, $(Y_{1/5}Cu_{4/5})_7O_z(NO_3)$ by the XRD pattern shown in FIG. 9. The specific resistance was 2.0$\Omega \cdot$ cm at a room temperature.

EXAMPLE 9

Figure 10:
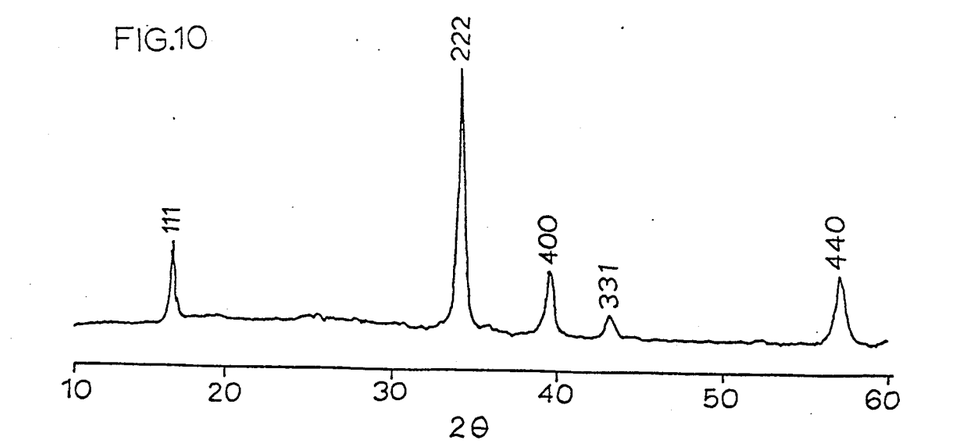
Figure 11:
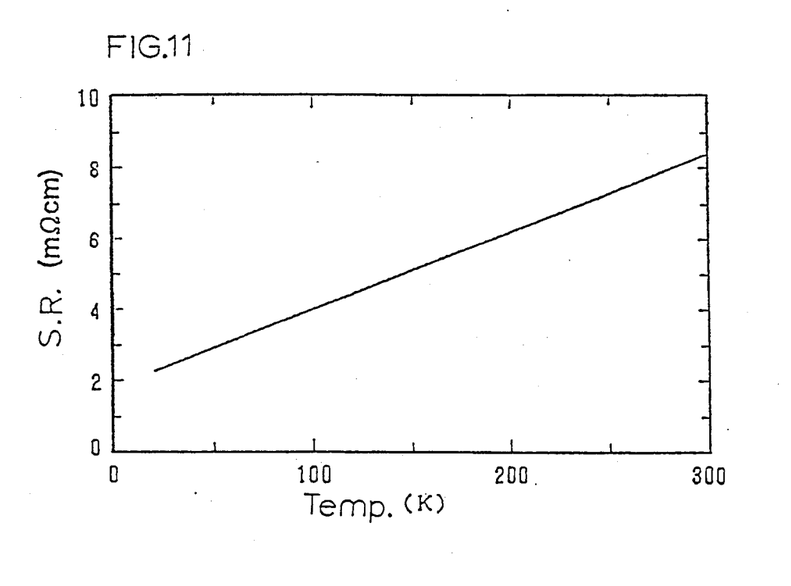

Indium nitrate trihydrate of 1.797 g, copper chloride (II) dihydrate of 0.863 g, and copper nitrate trihydrate of 7.34 g in a mole ratio of In/Cu=1/7 were well mixed and the mixture was fired in oxygen at 420° C. for 10 minutes. After the product was molded into pellets, the pellets were lapped in a gold foil followed by firing them at 520° C. for 30 minutes. The pellet was identified as the copper oxide ceramic, $(In_{1/8}Cu_{7/8})_7O_zCl_w$ by the XRD pattern shown in FIG. 10. FIG. 11 shows the relationship between a temperature and a specific resistance of the ceramic. This indicates that the ceramic has a fairly good electric coductivity and the specific resistance was $8 \times 10^{-3}\Omega \cdot$ cm at a room temperature.

EXAMPLE 10

Figure 12:
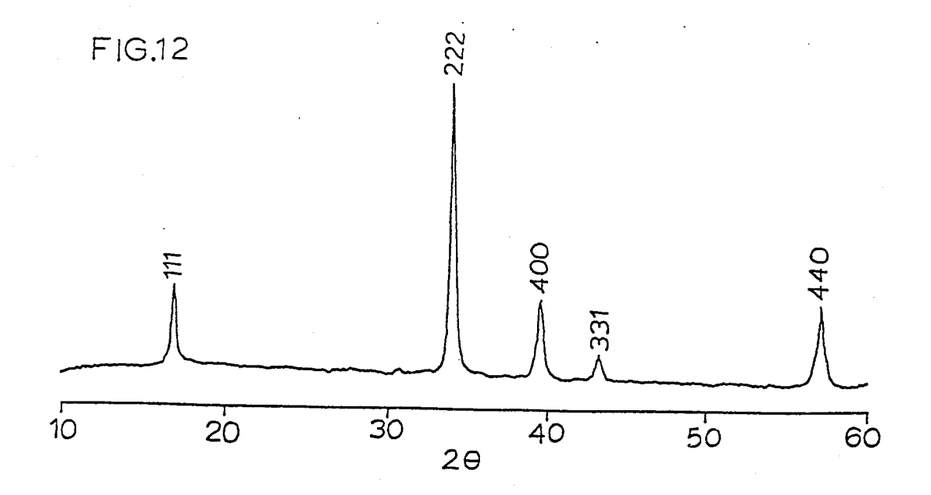

Indium nitrate trihydrate of 1.797 g, copper chloride (II) dihydrate of 0.432 g, and copper nitrate trihydrate of 7.34 g in a mole ratio of In/Cu=1/6.5 were dissolved in water of 10 ml, the solution was dried and fired in oxygen at 480° C. for 10 minutes. The product was identified as the copper oxide ceramic, $(In_{2/15}Cu_{13/15})_7O_zCl_w$ by the XRD pattern shown in FIG. 12. Chlorine was detected in the product by anion chromatography, but not nitrogen. The specific resistance of the product was $9 \times 10^{-3}\Omega \cdot$ cm at a room temperature.

EXAMPLE 11

Figure 13:
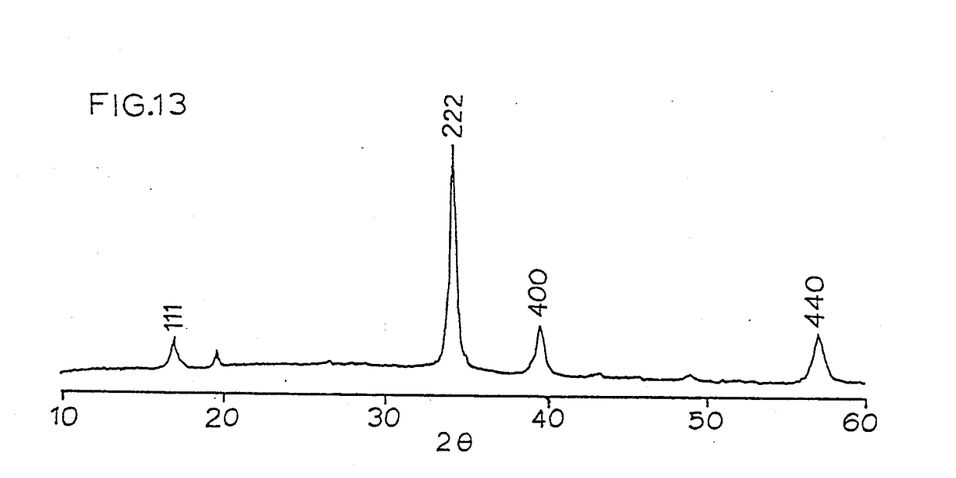

Scandium nitrate tetrahydrate of 1.575 g, copper chloride (II) dihydrate of 0.886 g, and copper nitrate trihydrate of 7.538 g in a mole ratio of Sc/Cu=1/7 were well mixed and the mixture was fired in oxygen at 480° C. for 30 minutes. The product was identified as the copper oxide ceramic, $(Sc_{1/8}Su_{7/8})_7O_zCl_w$ by the XRD pattern shown in FIG. 13. Chlorine was detected in the product by anion chromatography, but not nitrogen. The specific resistance of the product was $8 \times 10^{-3}\Omega \cdot$ cm at a room temperature.

EXAMPLE 12

Figure 14:
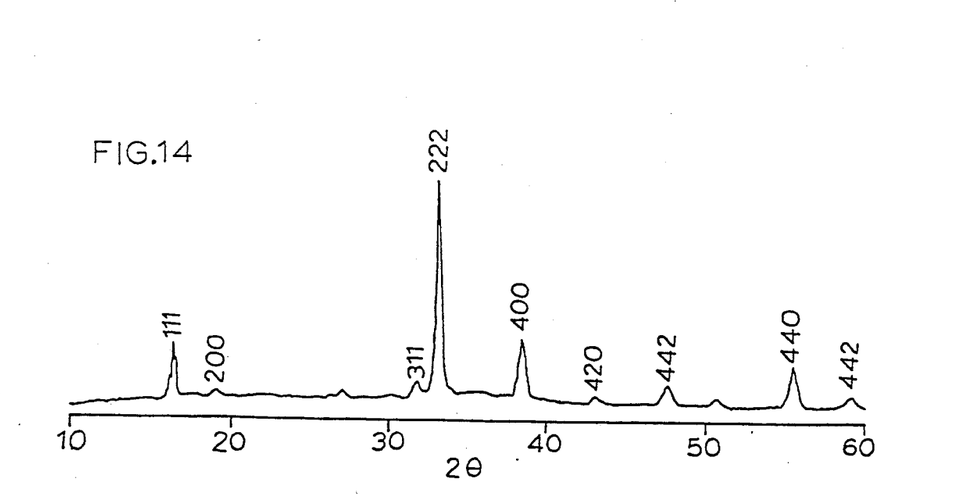

Copper chloride (II) dihydrate of 1.052 g and copper nitrate trihydrate of 8.948 g in a mole ratio of 1:6 were well mixed and the mixture was fired in oxygen at 230° C. for 6 hours. The product was identified as the copper oxide ceramic, $Cu_7O_z(Cl,NO_3)_w$ by the XRD pattern shown in FIG. 14. IR spectrum shows an IR absorption peak at 1360~1380 cm$^{-1}$ which is characteristic to $NO_3$. The specific resistance of the product was $1 \times 10^{-1}\Omega \cdot$ cm at a room temperature.

EXAMPLE 13

Figure 15:
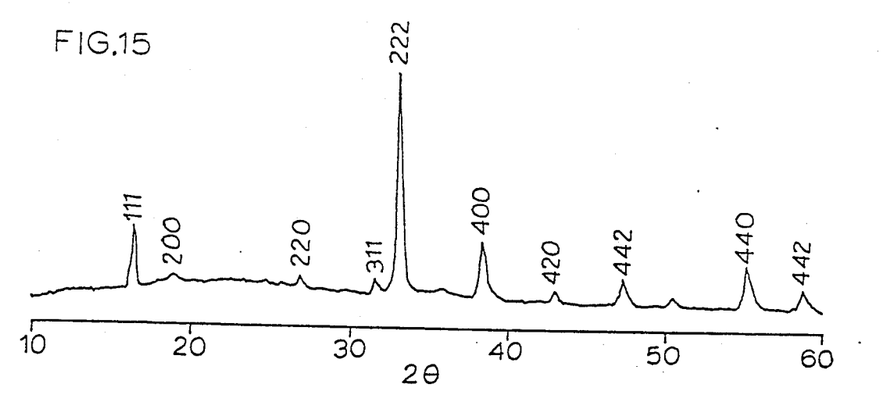

Copper chloride (II) dihydrate of 0.345 g and copper nitrate trihydrate of 2.936 g in a mole ratio of 1:13 were dissolved in water of 10 ml, the solution was dried and fired in oxygen at 230° C. for 6 hours. The product was identified as the copper oxide ceramic, $Cu_7O_z(Cl-$ ,NO$_3$)$_w$ by the XRD pattern shown in FIG. 15. IR spectrum shows an IR absorption peak at 1360~1380 cm$^{-1}$ which is characteristic to NO$_3$. The specific resistance of the product was $1\times10^{-1}\Omega\cdot$ cm at a room temperature.

We claim:

1. Conductive copper oxide ceramics which are represented by the following formula I:

$$(M_xCu_y)_7O_zA_w \qquad \text{I}$$

wherein M represents at least one element selected from the group consisting of In, Sc, Y, Tl, and Ga, A represents Cl, NO$_3$, or Cl and NO$_3$, x+y is a value of 1, x/y is a number of from 0 to 10, z is a number of from 6 to 8, and w is a number of from 1 to 9.

2. Conductive copper oxide ceramics according to claim 1, which are represented by the following formula II:

$$(M_xCu_y)_7O_z(NO_3) \qquad \text{II}$$

wherein M represents at least one element selected from the group consisting of In, Sc, Y, Tl, and Ga, x+y is a value of 1, x/y is a number of from 0 to 10, and z is a number of from 6 to 8.

3. Conductive copper oxide ceramics according to claim 1, which are represented by the following formula III:

$$Cu_7O_zA_w \qquad \text{III}$$

wherein A represents Cl or Cl and NO$_3$, z is a number of from 6 to 8, and w is a number of from 1 to 9.

4. A conductive copper oxide ceramic according to claim 2, which is represented by the following formula IV:

$$Cu_7O_z(NO_3) \qquad \text{IV}$$

wherein z is a number of from 6 to 8.

5. A process for producing conductive copper oxide ceramics of $(M_xCu_y)_7O_zA_w$ wherein M represents at least one element selected from the group consisting of In, Sc, Y, Tl, and Ga, A represents Cl or Cl and NO$_3$, x+y is a value of 1, x/y is a number of from 0 to 10, z is a number of from 6 to 8, and w is a number of from 1 to 9, which process comprises mixing at least one nitrate of a metal selected from the group consisting of In, Sc, Y, Tl, and Ga, with copper chloride, and firing the mixture at from 200° to 600° C.

6. A process for producing conductive copper oxide ceramics of $(M_xCu_y)_7O_zA_w$ wherein M represents at least one element selected from the group consisting of In, Sc, Y, Tl, and Ga, A represents Cl or Cl and NO$_3$, x+y is a value of 1, x/y is a number of from 0 to 10, z is a number of from 6 to 8, and w is a number of from 1 to 9, which process comprises mixing at least one chloride of a metal selected from the group consisting of In, Sc, Y, Tl, and Ga, with copper nitrate, and firing the mixture at from 200° to 600° C.

7. A process for producing conductive copper oxide ceramics of $(M_xCu_y)_7O_z(NO_3)$ wherein M represents at least one element selected from the group consisting of In, Sc, Y, Tl, and Ga, x+y is a value of 1, x/y is a number of from 0 to 10, and z is a number of from 6 to 8, which process comprises mixing at least one nitrate of a metal selected from the group consisting of In, Sc, Y, Tl, and Ga, with copper nitrate, and firing the mixture at from 200° to 600° C.

* * * * *